United States Patent
Nakamura et al.

(10) Patent No.: US 7,661,856 B2
(45) Date of Patent: Feb. 16, 2010

(54) VEHICULAR LAMP

(75) Inventors: Hiromi Nakamura, Shizuoka (JP);
Kazuma Mochizuki, Shizuoka (JP);
Yoshinao Daicho, Shizuoka (JP);
Hiromi Umehara, Shizuoka (JP); Yasuo Teranishi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/999,298

(22) Filed: Dec. 4, 2007

(65) Prior Publication Data
US 2008/0158897 A1    Jul. 3, 2008

(30) Foreign Application Priority Data
Dec. 7, 2006    (JP)    ............................. 2006-330868

(51) Int. Cl.
*B60Q 1/08*    (2006.01)
(52) U.S. Cl. ................... 362/465; 362/460; 362/524; 362/538
(58) Field of Classification Search ................ 362/538, 362/465–468, 37–60, 460, 508, 516, 523–532, 362/507, 427, 514; 340/903, 435, 436, 555–557; 180/167, 169; 315/82; 356/27, 28; 342/5, 342/20, 27, 104, 52, 61, 74, 75
See application file for complete search history.

(56) References Cited

U.S. PATENT DOCUMENTS

| | | | | |
|---|---|---|---|---|
| 5,249,157 | A | * 9/1993 | Taylor | ......................... 340/903 |
| 6,459,476 | B2 | 10/2002 | Nishimura | |
| 6,550,944 | B2 | * 4/2003 | Kusagaya | .................... 362/466 |
| 6,828,928 | B2 | * 12/2004 | Dubrovin | ..................... 342/70 |

FOREIGN PATENT DOCUMENTS

JP    2001-260777    9/2001

* cited by examiner

*Primary Examiner*—Jong-Suk (James) Lee
*Assistant Examiner*—Leah S Lovell
(74) *Attorney, Agent, or Firm*—William L. Androlia; H. Henry Koda

(57) ABSTRACT

A vehicular lamp 1 including a lamp chamber 7, which is formed with a lamp body 3 and a transparent front cover 5 attached to the front opening of the lamp body, and a lamp unit 13, which includes a reflector 9 and a light source 11 and is provided in the lamp chamber 7 so that the optical axis direction of the lamp unit is adjusted by a tilting movement adjustment mechanism 15, wherein a millimeter wave radar device 25 is attached to the lamp body, and a reflection mirror 31 that reflects, toward the front of the lamp, a millimeter wave signal 29 emitted by the millimeter wave radar device is attached to a supporting frame 21 which is a part of the tilting movement adjustment mechanism.

5 Claims, 2 Drawing Sheets

VEHICULAR LAMP

BACKGROUND OF THE INVENTION

1. Field of the Invention

The present invention relates to a vehicular lamp that includes a lamp unit comprised of a reflector and a light source and provided in a lamp chamber, which is formed by a lamp body having a front opening and a transparent front cover attached to the front opening of the lamp body, so that the optical axis direction of the lamp unit is adjusted by a tilting movement adjustment mechanism.

2. Description of the Related Art

Laser radar mechanisms have conventionally been in practical use as apparatuses to detect a separation distance and a relative velocity between a vehicle and an object that is present so as to oppose the traveling direction of the vehicle or the periphery of the vehicle.

Such laser radar mechanisms detect the separation distance and the relative velocity with respect to an object by emitting a laser beam toward the object and then receiving a reflection beam from the object.

Conventionally, such laser radar mechanisms are fixed to the front of a vehicle body in order to, for example, detect vehicular front information such as an inter-vehicular distance between the vehicle and another vehicle traveling in front of the vehicle.

However, when the laser beam emitting portion or the laser beam receiving portion of such a laser radar mechanism that is fixed to the front of the vehicle body while being exposed to the surroundings becomes dirty due to mud splashes while the vehicle is in operation or the like, the detection ability of the laser radar mechanism would be lowered. When this occurs, then it becomes impossible to achieve a predetermined level of detection performance. To cope with this situation, it has been suggested that, for example, a laser radar mechanism be covered by an exclusive-use cover that surrounds the laser radar mechanism. However, this leads to a problem that the installation of the exclusive-use cover makes the cost of the vehicle higher.

In addition, when such a laser radar mechanism is fixed to the front of a vehicle body, another problem arises. The detection angle of the laser radar mechanism is affected by changes in the posture of the vehicle.

In order to solve these problems, a proposal has been made in which a front information detecting means such as a laser radar mechanism is fixed to a lamp unit that is installed in a vehicular lamp as disclosed in U.S. Pat. No. 6,459,476. In this vehicular lamp, the lamp unit is provided inside a lamp-chamber so that the optical axis direction of the lamp unit is adjusted by a tilting movement adjustment mechanism (i.e., optical axis direction adjusting means), wherein the lamp chamber is comprised of a lamp body that has a front opening in the front thereof and a transparent front cover attached to the front opening of the lamp body, and the lamp unit is comprised of a reflector and a light source.

In this structure, since the laser radar mechanism is housed in the lamp chamber that is installed in the vehicular lamp, the laser radar mechanism is protected from, for instance, mud splashes during the operation of the vehicle, and an exclusive-use cover is not required to be installed.

In addition, since the laser radar mechanism is able to make a tilting movement together or integrally with the lamp unit by the tilting movement adjustment mechanism, and since the radiation angle of the radiated laser beam can be appropriately adjusted, the reflection beam that corresponds to the front information is not affected by the changes in the posture of the vehicle, and it is possible to accurately detect the vehicular front information.

However, when the laser radar mechanism is attached to the lamp unit itself that is driven by the tilting movement adjustment mechanism as described above, the load applied on the tilting movement adjustment mechanism is extremely large since the laser radar mechanism is generally quite heavy. As a result, it is necessary to increase the strength of the mechanism elements of the tilting movement adjustment mechanism; and in addition, a smooth performance of the tilting movement adjusting operation by the tilting movement adjustment mechanism is prevented.

BRIEF SUMMARY OF THE INVENTION

In view of the above, it is an object of the present invention to solve the problems described above and to provide a vehicular lamp that properly detects a separation distance (or an inter-vehicle distance) and/or a relative velocity with respect to an object, without having to increase the mechanical strength of a tilting movement adjustment mechanism that makes the tilting movement of the lamp unit.

The above objects is accomplished by a unique structure of the present invention for a vehicular lamp that includes a lamp chamber, which is comprised of a lamp body having a front opening and a transparent front cover attached to the front opening of the lamp body, and a lamp unit, which is comprised a reflector and a light source and is provided in the lamp chamber in such a manner that the optical axis direction of the lamp unit is adjustable with use of a tilting movement adjustment mechanism; and in the present invention, a millimeter wave radar device, which emits a millimeter wave signal to detect a separation distance and/or a relative velocity with respect to an object, based on the reflection wave signal from the object that has reflected the emitted millimeter wave signal, is attached to the lamp body; and a reflection mirror that reflects, toward the front of the vehicular lamp, the millimeter wave signal emitted by the millimeter wave radar device is provided within the lamp chamber in such a manner that the direction in which the millimeter wave signal is reflected can be adjusted with use of the tilting movement adjustment mechanism.

In the vehicular lamp configured as described above, the radiation direction of the millimeter wave signal emitted by the millimeter wave radar device is set by the reflection mirror that is provided so that the direction in which the millimeter wave signal is reflected is adjusted with the use of the tilting movement adjustment mechanism. Accordingly, it is possible to adjust the radiation direction of the millimeter wave signal integrally with the lamp unit that is tilted by the tilting movement adjustment mechanism. As a result, the millimeter wavesignal is accurately radiated onto an object (including a preceding vehicle) that is present in the forward direction of the lamp unit and also the separation distance and/or the relative velocity of the object can be accurately detected based on the reflection wave signal resulting from the millimeter wave signal.

Further, in the present invention, the millimeter wave radar device which is generally heavy is not attached to the lamp unit that is a load on the tilting movement adjustment mechanism, and it is instead attached to the lamp body. In other words, the only component that is added to the lamp unit and becomes a load on the tilting movement adjustment mechanism is the reflection mirror that reflects, toward the front of the lamp, the millimeter wave signal emitted by the millimeter wave radar device. Accordingly, it is possible to keep the increase in the load on the tilting movement adjustment mechanism to an extremely small level. As a result, the radar device that detects the separation distance and/or the relative velocity with respect to an object can be installed without increasing the strength of the tilting movement adjustment mechanism that makes tilting movements of the lamp unit. In addition, the installation of the millimeter wave radar device does not prevent the tilting movement adjustment mechanism from smoothly performing the tilting movement adjusting operation of the lump unit.

It is desirable for the vehicular lamp configured as described above that the reflection mirror is attached to the tilting movement adjustment mechanism.

In the vehicular lamp with this structure, it is possible to easily adjust the direction in which the millimeter wave signal is reflected by the reflection mirror with the use of the tilting movement adjustment mechanism.

Further, it is desirable for the vehicular lamp configured as described above to have an arrangement that the millimeter wave radar device is positioned beneath the lamp unit.

In the vehicular lamp of the present invention as described above, the air of which the temperature has become higher due to the heat generated by the light source installed in the lamp unit advances toward the upper portion of the lamp chamber. Accordingly, the millimeter wave radar device positioned on the lower side of the lamp is less affected by the heat generated by the light source, and as to the heat resistance which the millimeter wave radar device is required to have, it is possible that the heat resistance level of the millimeter wave radar device is low, so that the millimeter wave radar device has a lower level of heat resistance.

Furthermore, in the vehicular lamp described above, it is desirable that the lamp unit is a projector type lamp unit in which the reflection beam from the reflector is radiated toward the front of the vehicular lamp via a projection lens that is provided in front of the reflector, and the millimeter wave radar device is provided on the side of the projector type lamp unit.

In the vehicular lamp described above, it is possible to effectively utilize the open space that is on the side of the lamp unit, which is likely to be formed in vehicular lamps provided with projector type lamp units, as a space for installing therein the millimeter wave radar device. In addition, the millimeter wave radar device that is positioned on the side of the lamp unit is less likely to be affected by the heat generated by the lamp unit. Accordingly, it is permissible that the millimeter wave radar device has a lower level of heat resistance.

Furthermore, it is desirable for the vehicular lamp described above to have an arrangement that the millimeter wave radar device is attached to the lamp body in such a manner that at least a part of the millimeter wave radar device is exposed to the outside of the lamp body.

In the vehicular lamp described above, because the exposed portion of the millimeter wave radar device is in contact with the ambient air, it is easier to release the heat to the outside, and thus it is possible to prevent the temperature increase of the millimeter wave radar device and allow the millimeter wave radar device to have a lower level of heat resistance.

As seen from the above, in the vehicular lamp of the present invention, the radiation direction of the millimeter wave signal emitted by the millimeter wave radar device is set by the reflection mirror that is provided so that the direction in which the millimeter wave signal is reflected is adjusted by the tilting movement adjustment mechanism. Accordingly, it is possible to adjust the millimeter wave signal direction integrally with the lamp unit using the tilting movement adjustment mechanism. As a result, the millimeter wave signal can be accurately radiated onto the object that is present in the forward direction of the lamp unit, and also the separation distance and/or the relative velocity with respect to the object can be accurately detected based on the reflection wave signal resulting from the millimeter wave signal.

Also, in the present invention, the millimeter wave radar device that is generally heavy and puts a load on the tilting movement adjustment mechanism is not provided on the lump unit but is attached to the lamp body. In other words, in the present invention, the only component that is added onto the lamp unit and becomes a load on the tilting movement adjustment mechanism is the reflection mirror that reflects, toward the front of the lamp, the millimeter wave signal emitted by the millimeter wave radar device. Accordingly, it is possible to keep the increase in the load on the tilting movement adjustment mechanism to an extremely small level; and as a result, it is possible to install the millimeter wave radar, which detects the separation distance and/or the relative velocity with respect to an object, without increasing the strength of the tilting movement adjustment mechanism that causes the tilting motion of the lamp unit. Also, the installation of the radar does not prevent smooth performance of the tilting movement adjustment mechanism.

Consequently, the vehicular lamp of the present invention not only has the conventional function to radiate illumination light but also is able to properly detect the separation distance and/or the relative velocity of an object present in the forward direction of the lamp unit.

DETAILED DESCRIPTION OF THE INVENTION

Hereinafter, a vehicular lamp according to the present invention will be described in detail with reference to the accompanying drawings.

Figure 1:
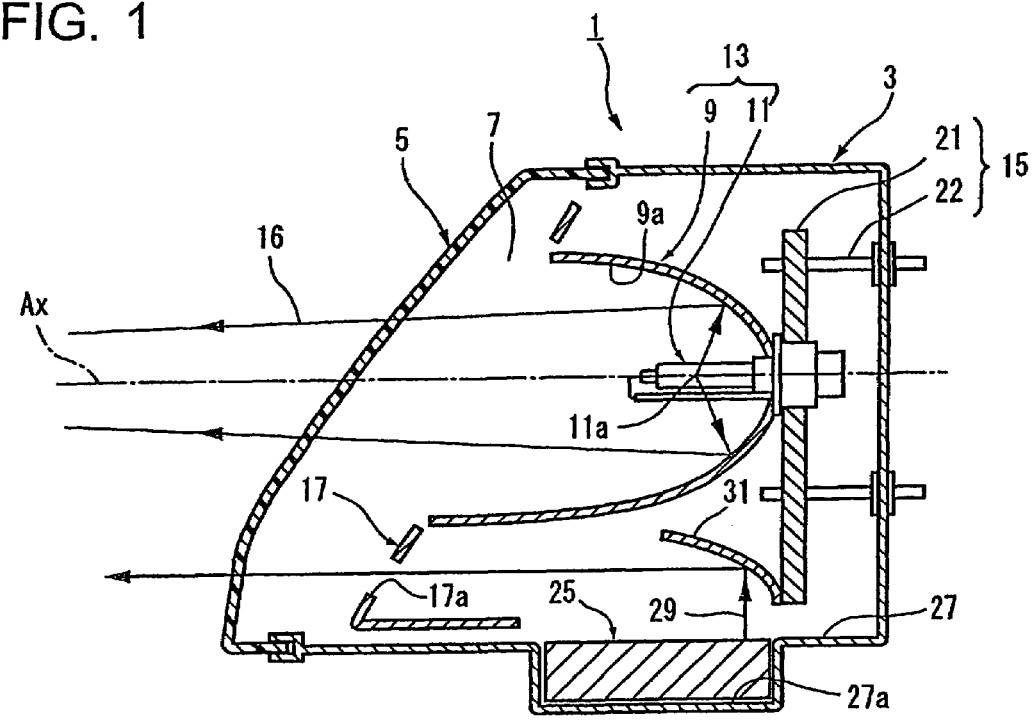
FIG. 1 is a longitudinal sectional view of a vehicular lamp according to a first embodiment of the present invention.

FIG. 1 shows in cross-section a vehicular lamp according to the first embodiment of the present invention.

The vehicular lamp 1 shown in FIG. 1 is used as a headlamp of a vehicle. The lamp I includes a lamp unit 13 that is provided within a lamp chamber 7 in such a manner that the direction of an optical axis Ax of the lamp unit 13 is adjustable with the use of a tilting movement adjustment mechanism 15. In this structure, the lamp chamber 7 is defined and formed by a lamp body 3 that has a front opening in the front thereof and is configured to be fixed to a vehicle body and a transparent front cover 5 that is attached to the front opening of the lamp body 3, and the lamp unit 13 is comprised of a reflector 9 and a light source 11.

The reflector 9 has a reflective surface 9*a* of a generally parabolic curved plane shape, with the focal point being at a light emitting unit 11*a* of the light source 11 which is a discharge bulb. The central axis of the reflective surface 9*a* having a shape of generally parabolic curved plane is the optical axis Ax positioned at the center of a radiated light flux 16 reflected on the reflective surface 9a toward the front of the vehicle.

The reflector 9 is provided with an extension 17 on its outside periphery of the front end so that the open space behind the reflector 9 is prevented from being seen from the front cover 5 side through a gap that is between the reflector 9 and the lamp body 3. This reflector extension 17 is fixed to the lamp body 3 via a frame member, which is not shown in the drawings.

The tilting movement adjustment mechanism 15 is comprised of a frame 21 onto which the lamp unit 13 is fixed and a tilt adjusting means 22 that is joined to the lamp body 3 in such a manner that the tilt adjusting means 22 is able to be adjusted in the posture of the supporting frame 21 by an arbitrary angle in a horizontal direction and in a vertical direction.

More specifically, the tilt adjusting means 22 is comprised of, for example, an aiming mechanism that adjusts the angle of the optical axis Ax so as to be inclined slightly downward with respect to the horizontal direction and a swivel mechanism that automatically adjusts the optical axis Ax in the horizontal direction in accordance with a steering angle made by the operation of the steering wheel. When an aiming adjustment has been made by the aiming mechanism, the optical axis Ax is normally inclined in a direction that is approximately 0.5 to 0.6 degrees downward with respect to the horizontal direction.

In the vehicular lamp described above, a millimeter wave radar device 25 is provided beneath the lamp unit 13, and this millimeter wave radar device 25 is set to emit a millimeter wave signal of a 76 GHz band and detect vehicular front information such as a separation distance and/or a relative velocity with respect to an object (for instance, a preceding vehicle), based on a reflection wave signal from the object that has reflected the millimeter wave signal. More specifically, in the embodiment of FIG. 1, the millimeter wave radar 25 is composed of a high frequency circuit unit, a signal processing unit, and an antenna unit built therein and is attached to a recessed portion 27a that is formed on the bottom wall 27 of the lamp body 3 positioned beneath the lamp unit 13.

Furthermore, a reflection mirror 31 is attached to a supporting frame 21 onto which the lamp unit 13 is fixed. This mirror 31 reflects the millimeter wave signal 29, which is emitted by the millimeter wave radar device 25, toward the front of the lamp. In other words, the reflection mirror 31 reflects the millimeter wave signal 29 toward the front of the lamp (or vehicle) in a direction that is generally parallel to the optical axis Ax of the lamp unit 13.

As seen from the above, in the structure of the shown embodiment, the millimeter wave signal 29 is emitted by the millimeter wave radar device 25, is reflected toward the front of the lamp by the reflection mirror 31 and is emitted out forward through a hole 17a provided in the reflector extension 17.

As seen from the above, in the vehicular lamp 1 as described above and shown in FIG. 1, the millimeter wave radar device 25 that detects the separation distance and/or the relative velocity with respect to an object is housed in the lamp chamber 7 of the vehicular lamp 1. Accordingly, the millimeter wave radar device 25 is, while the vehicle is in operation, protected from mud splashes, rainwater, and the like without installing an exclusive-use cover. Consequently, with elimination of a cover that is exclusively used for protecting the radar, the cost related to installation of the millimeter wave radar device 25 can be lowered.

In addition, in the vehicular lamp 1 described above, the radiation direction of the millimeter wave signal 29 emitted by the millimeter wave radar device 25 is set by the reflection mirror 31 attached to the supporting frame 21 which is a part of the tilting movement adjustment mechanism 15. Accordingly, it is possible to adjust the radiation direction of the millimeter wave signal 29 together with the lamp unit 13 by operating the tilting movement adjustment mechanism 15. As a result, the millimeter wave signal 29 can be accurately radiated onto the object present in the forward direction of the lamp unit 13, and the separation distance and/or the relative velocity of the object can be detected accurately based on the reflection wave signal brought by the millimeter wave signal 29. Moreover, the millimeter wave radar device 25 is less likely to be affected by bad weather such as rain, snow, or frost than a conventional laser radar mechanism that uses a laser beam, and the level of precision in the detection process can be higher than the conventional device as well.

Further, in the vehicular lamp 1 described above, the millimeter wave radar device 25 itself that includes a high frequency circuit unit, the signal processing unit, and the antenna unit built therein and is thus heavy is attached to the lamp body 3. In other words, the millimeter wave radar device 25 is not attached to the lamp unit 13 so as to be a load on the tilting movement adjustment mechanism 15. The only component that is added on the lamp unit 13 and becomes a load on the tilting movement adjustment mechanism 15 is only the reflection mirror 31 that reflects, toward the front of the lamp, the millimeter wave signal 29 emitted by the millimeter wave radar device 25. Accordingly, it is possible to keep the increase in the load on the tilting movement adjustment mechanism 15 to an extremely small level and to install the millimeter wave radar device 25, that detects the separation distance and/or the relative velocity with respect to an object, without increasing the strength of the tilting movement adjustment mechanism 15 that causes the tilting motion of the lamp unit 13. In addition, the installation of the millimeter wave radar device 25 does not prevent the tilting movement adjustment mechanism 15 from smoothly performing its tilting movement adjusting operation.

As seen from the above, the vehicular lamp 1 described above not only has the conventional function to radiate illumination light but also is able to properly detect the separation distance and/or the relative velocity of an object that is present in the forward direction of the lamp unit.

Furthermore, in the vehicular lamp 1, the millimeter wave radar device 25 is positioned beneath the lamp unit 13.

In this structure, the air of which temperature has become higher due to the heat generated by the light source 11 of the lamp unit 13 can move toward the upper portion of the lamp chamber 7. As a result, the millimeter wave radar device 25 provided on the lower side of the lamp is less affected by the heat generated by the light source 11, and as to the heat resistance which the millimeter wave radar device is required to have, it is possible that the level of heat resistance is low, and the millimeter wave radar device 25 has a lower level of heat resistance.

Figure 2:
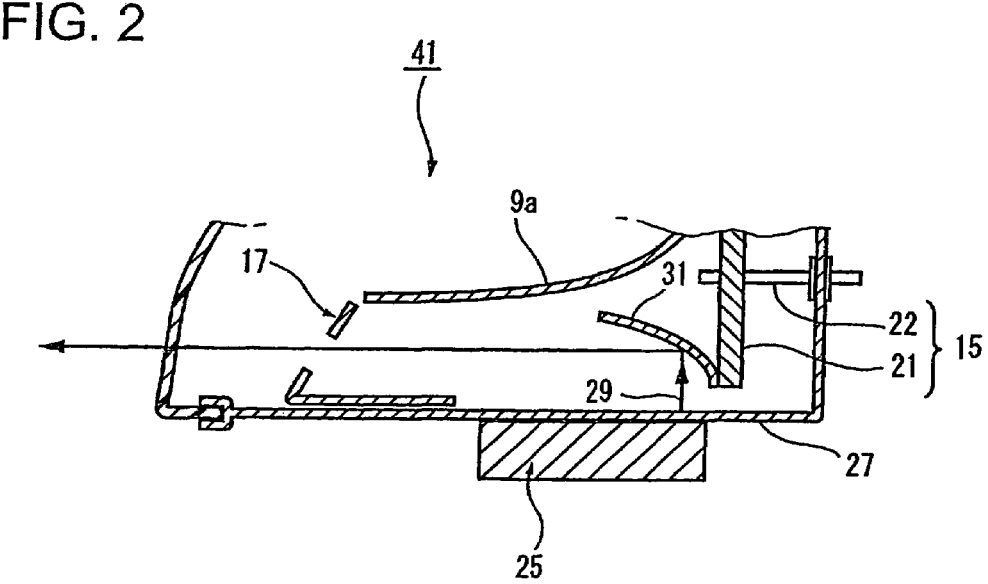
FIG. 2 is a longitudinal sectional view of an essential part of a vehicular lamp according to a second embodiment of the present invention.

FIG. 2 shows a vehicular lamp of the second embodiment of the present invention.

The vehicular lamp 41 of the this embodiment is obtained by changing the positional arrangement of the millimeter wave radar device 25. In the structure of FIG. 2, the millimeter wave radar device 25 is attached to the outer surface of the bottom wall 27 of the lamp body 3.

In a case where the bottom wall 27 is made of a resin, the millimeter wave signal 29 is able to pass through the bottom wall 27, and therefore, it is possible to provide the millimeter wave radar device 25 outside the bottom wall 27.

In the structure of FIG. 2, the bottom wall 27 of the lamp body 3 functions as a heat shielding plate, and the heat generated by the lamp unit 13 is even less likely to affect the millimeter wave radar device 25. In addition, because the millimeter wave radar device 25 is exposed to the outside of the lamp body 3, the contact thereof with the ambient air makes it easier to release the heat of the millimeter wave radar device 25. Consequently, it is possible that-the millimeter wave radar device 25 has a further lowered level of heat resistance.

In the embodiment show in FIG. 2, the entirety of the millimeter wave radar device 25 is exposed to the outside of the lamp body 3. However, the millimeter wave radar device 25 can be attached to the lamp body 3 in such a manner that at least a part of the millimeter wave radar device 25 is exposed to the outside of the lamp body 3. Further alternatively, a heat sink can be attached to the main body of the millimeter wave radar device 25 so that the heat sink is exposed to the outside of the lamp body 3. In these structures, because at least a part of the millimeter wave radar device 25 is exposed to the outside of the lamp body 3 and is in contact with the ambient air, the effect of the heat generated by the light source is small, improving the degree of freedom in installing the millimeter wave radar device 25. It is also possible to provide the millimeter wave radar device 25 on the top wall of the lamp unit 13.

Figure 3:
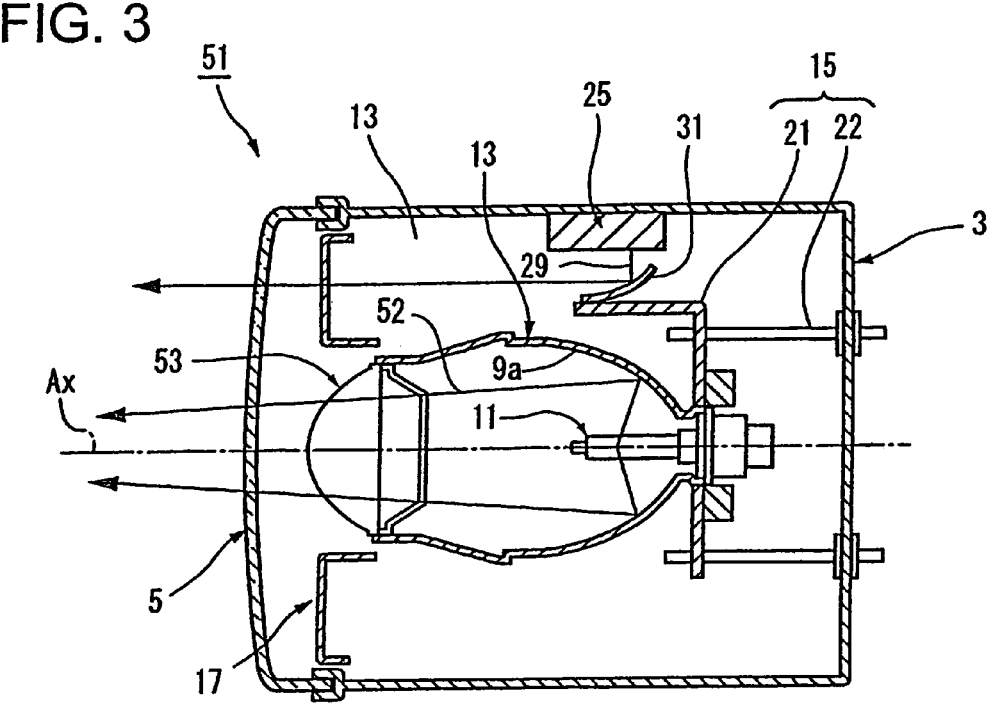
FIG. 3 is a horizontal sectional view of a vehicular lamp according to a third embodiment of the present invention.

FIG. 3, a top view, shows a vehicular lamp of the third embodiment of the present invention. The constituent elements that are the same as those in the first embodiment, such as the lamp body 3, the front cover 5, and the tilting movement adjustment mechanism 15, will be referred to by the same reference characters, and the explanation thereof will be omitted.

In the vehicular lamp 51 of the third embodiment, the lamp unit 13 that is fixed to the supporting frame 21 of the tilting movement adjustment mechanism 15 is a projector type lamp unit, and thus it radiates a reflection beam 52 from the reflective surface 9a toward the front of the lamp via a projection lens 53 provided in front of the reflective surface 9a.

The millimeter wave radar device 25 is provided on a side of the projector type lamp unit 13, and the reflection mirror 31 that reflects, toward the front of the lamp, the millimeter wave signal 29 emitted by the millimeter wave radar device 25 is fixed to the supporting frame 21 in a position that is on the side of the lamp unit 13. The millimeter wave radar device 25 is fixed to the side wall of the lamp body 3.

In this structure as well, the millimeter wave signal 29 emitted by the millimeter wave radar device 25 is reflected toward the front of the lamp by the reflection mirror 31 and is emitted forward through the reflector extension 17.

In the vehicular lamp 51 of the third embodiment, it is possible to effectively utilize the open space which is on the side of the lamp unit 13, which is likely to be formed in a vehicular lamp that uses a projector type lamp unit, as a space for installing therein the millimeter wave radar device 25. In addition, the millimeter wave radar device 25 that is positioned on the side of the lamp unit 13 is less likely to be affected by the heat of the lamp unit 13. Thus, it is possible that the millimeter wave radar device 25 has a lower level of heat resistance.

Figure 4:
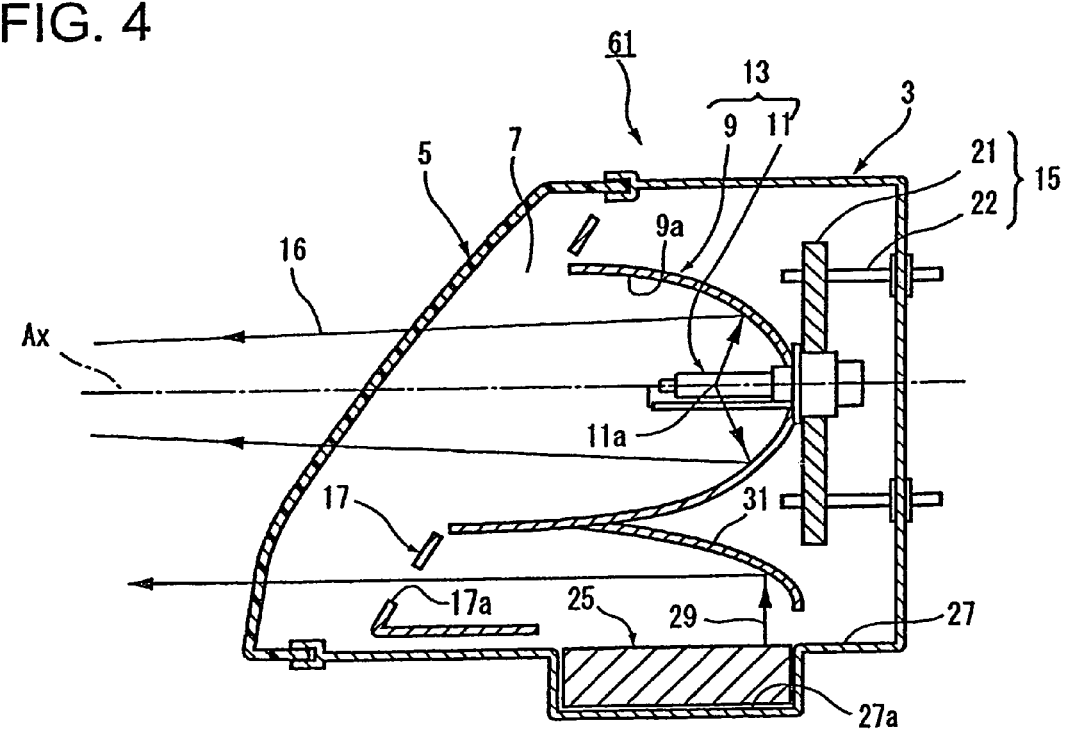
FIG. 4 is a longitudinal sectional view of a vehicular lamp according to a fourth embodiment of the present invention.

FIG. 4, a longitudinal sectional view, shows a vehicular lamp of the fourth embodiment of the present invention.

In the vehicular lamp 61 of this fourth embodiment, the position the reflection mirror 31 is provided differs from that of FIG. 1. The reflection mirror 31 in FIG. 4 is fixed to the lower side of the reflector 9 of the lamp unit 13 in an integral manner. The reflection mirror 31 can be integrally molded with the reflector 9, and it is also possible that the reflection mirror 31 and the reflector 9 be molded separately and assembled integrally.

In this structure of FIG. 4, since the reflection mirror 31 is provided on the reflector 9 of the lamp unit 13, the radiation direction of the millimeter wave signal 29 emitted by the millimeter wave radar device 25 is adjusted by the tilting movement adjustment mechanism 15 on which the lamp unit 13 that includes the reflector 9 is mounted.

Accordingly, in this structure, the millimeter wave signal 29 emitted by the millimeter wave radar device 25 is reflected toward the front of the lamp by the reflection mirror 31 that is integrally provided on the reflector 9 and emitted forward through the hole 17a provided in the reflector extension 17.

The configurations of the lamp body, the front cover, the lamp unit, the tilting movement adjustment mechanism, the millimeter wave radar device, the reflection mirror, and the like of the vehicular lamps of the present invention are not limited to the examples described above and shown in FIGS. 1 through 4. Needless to say, the configurations can be in any other various forms based on the gist of the present invention.

For example, though the tilting movement adjustment mechanism described in the above embodiments includes both the aiming mechanism and the swivel mechanism, it is acceptable as long as the tilting movement adjustment mechanism includes at least the aiming mechanism. In addition, needless to say, other tilting movement adjustment mechanisms such as an optical axis direction automatic adjustment mechanism (e.g., an automatic leveling system) can be employed additionally in the present invention.

The invention claimed is:

1. A vehicular lamp comprising
    a lamp chamber formed by a lamp body having a front opening and a transparent front cover attached to the front opening of the lamp body, and
    a lamp unit formed by a reflector and a light source and provided in the lamp chamber so that an optical axis direction thereof is adjustable use of by a tilting movement adjustment mechanism, wherein
    a millimeter wave radar device, which emits a millimeter wave to detect a separation distance and a relative velocity with respect to an object based on a reflection wave from an object that has reflected the emitted millimeter wave, is attached to the lamp body and provided in the lamp chamber, and
    a reflection minor, which reflects, toward front of the vehicular lamp, the millimeter wave emitted by the millimeter wave radar device, is provided within the lamp chamber in such a manner that a direction in which the millimeter wave is reflected is adjustable with use of the tilting movement adjustment mechanism.

2. The vehicular lamp according to claim 1, wherein the reflection mirror is attached to the tilting movement adjustment mechanism.

3. The vehicular lamp according to claim 1, wherein the millimeter wave radar device is positioned beneath the lamp unit.

4. The vehicular lamp according to claim 1, wherein
    the lamp unit is a projector type lamp unit in which a reflection beam from the reflector is radiated toward front of the vehicular lamp via a projection lens provided in front of the reflector, and
    the millimeter wave radar device is provided on a side of the projector type lamp unit.

5. The vehicular lamp according to claim 1, wherein the millimeter wave radar device is attached to the lamp body in such a manner that at least a part of the millimeter wave radar device is exposed to outside of the lamp body.

* * * * *